US006195471B1

United States Patent
Larsen

(10) Patent No.: US 6,195,471 B1
(45) Date of Patent: Feb. 27, 2001

(54) METHOD AND APPARATUS FOR COMBINING A PLURALITY OF IMAGES AT RANDOM STITCH POINTS WITHOUT INCURRING A VISIBLE SEAM

(75) Inventor: David B. Larsen, Woburn, MA (US)

(73) Assignee: AGFA Corporation, Wilmington, MA (US)

(*) Notice: Subject to any disclaimer, the term of this patent is extended or adjusted under 35 U.S.C. 154(b) by 0 days.

(21) Appl. No.: 09/047,084

(22) Filed: Mar. 24, 1998

(51) Int. Cl.$^7$ .................................................. G06K 9/36
(52) U.S. Cl. ...................... 382/284; 358/450; 250/208.1
(58) Field of Search ................................. 382/284, 275, 382/267, 254; 358/450, 540, 298; 347/234; 250/208.1; 348/324, 584

(56) References Cited

U.S. PATENT DOCUMENTS

| | | | |
|---|---|---|---|
| 4,899,220 | * | 2/1990 | Basile et al. ........................... 348/584 |
| 5,144,448 | * | 9/1992 | Hornbaker et al. ................... 348/324 |
| 5,453,777 | * | 9/1995 | Pensavecchia et al. .............. 347/234 |
| 5,768,439 | * | 6/1998 | Suzuka et al. ........................ 382/254 |
| 5,812,704 | * | 9/1998 | Pearson et al. ....................... 382/284 |
| 5,942,745 | * | 8/1999 | Kline et al. ......................... 250/208.1 |

* cited by examiner

Primary Examiner—Bhavesh Mehta
Assistant Examiner—Ishrat Sherali
(74) Attorney, Agent, or Firm—John A. Merecki; Edward L. Kelley

(57) ABSTRACT

The present invention eliminates artifacts in an image formed using a plurality of imaging sources. Visible seams in the image are eliminated by randomizing the stitch point between the scan lines produced by each imaging source. The randomization may be optimized by additionally applying a method for relocating the random stitch point based on the data content of the scan line, adjacent scan lines, and other criteria. The present invention further compensates for in-scan and cross-scan errors caused by thermally induced errors, spinner synchronization errors, mechanical misalignment, and other factors associated with the use of a plurality of imaging systems. A photodetector system, comprising a mask having a pair of triangular openings, provides measurements of the in-scan and cross-scan errors.

25 Claims, 9 Drawing Sheets

METHOD AND APPARATUS FOR COMBINING A PLURALITY OF IMAGES AT RANDOM STITCH POINTS WITHOUT INCURRING A VISIBLE SEAM

FIELD OF THE INVENTION

The present invention is in the field of imaging systems. More particularly, the present invention provides a method and apparatus for combining ("stitching") a plurality of images produced by multiple imaging sources into a single image without creating a visible seam or other artifacts at the interfaces between the plurality of images.

BACKGROUND OF THE INVENTION

Flatfield scanning is commonly used in a number of applications, including flatbed scanners, capstan imagesetters, and even some external drum systems (e.g., large capstans). A serious limitation of many flatfield scanning systems is that there are practical limits to the length of the scan line. This generally limits the page width of these systems to the range of 14 to 18 inches.

In an attempt to overcome this page width limitation, efforts have been made, with limited success, to combine the partial scan lines produced by a plurality of imaging sources into a single, composite image. Unfortunately, the seams between the partial scan lines produced by each imaging source are generally highly visible in the composite image. Additional artifacts produced by in-scan errors, cross-scan errors, pixel size variations, exposure variations, and other factors, may also be introduced, further diminishing the quality of the composite image. The in-scan and cross-scan errors may be produced for a number of reasons including spinner synchronization errors, thermally induced errors, or mechanical misalignment.

The present invention incorporates many unique features which eliminate these and other problems associated with the use of multiple imaging sources to create a single image.

SUMMARY OF THE INVENTION

The present invention provides various methods and apparatus for eliminating artifacts in an image formed using a plurality of imaging sources. For example, the present invention provides a unique stitching method for eliminating visible seams in the image by randomizing the stitch point between the scan lines produced by each imaging source. The randomization may be further optimized by additionally applying a method for relocating the random stitch point based on the data content of the scan line, adjacent scan lines, and other criteria.

The present invention also provides methods and apparatus for substantially eliminating in-scan and cross-scan errors caused by thermally induced errors, spinner synchronization errors, mechanical misalignment, and other factors associated with the use of a plurality of imaging systems. A unique photodetector system, comprising a mask having a pair of triangular openings, provides measurements of the in-scan and cross-scan errors.

BRIEF DESCRIPTION OF THE DRAWINGS

The features of the present invention will best be understood from a detailed description of the invention and a preferred embodiment thereof selected for the purposes of illustration and shown in the accompanying drawings in which.

DETAILED DESCRIPTION OF THE INVENTION

Figure 1:
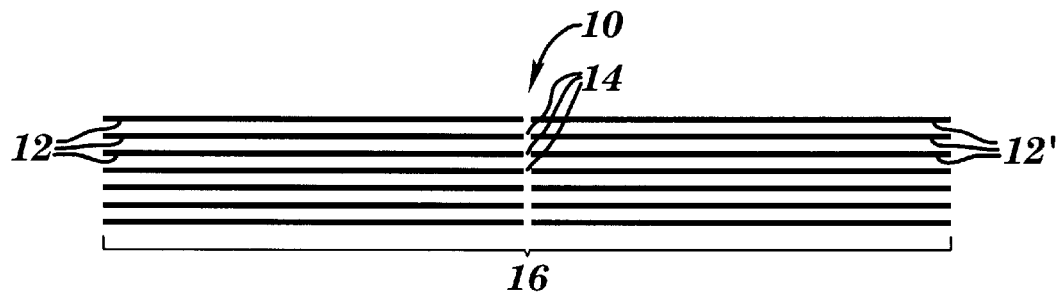
FIG. 1 shows the type of visible seam commonly produced between the scan lines generated by a pair of imaging sources in accordance with the prior art.

The features and advantages of the present invention are illustrated in detail in the accompanying drawings, wherein like reference numerals refer to like elements throughout the drawings.

In prior art imaging systems wherein a plurality of individual scan lines are combined to form a longer scan line, deleterious visible artifacts are often produced in the recorded image. In FIG. 1, for example, there is illustrated a highly visible seam 10 created when the partial scan lines 12, 12' produced by a pair of imaging sources are butted end to end in the same stitch location 14 to form a series of longer, composite scan lines 16. The seam 10 is visible, and highly noticeable, on the recorded image, unless near perfect alignment between the ends of the partial scan lines 12, 12' is achieved.

Figure 2:
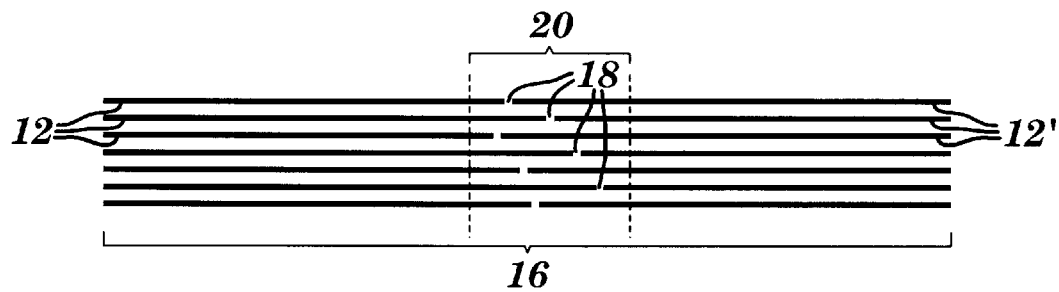
FIG. 2 illustrates the manner in which the location of the stitch point between each pair of scan lines is randomized within a stitch zone in accordance with the present invention to significantly reduce the visibility of stitching point errors.

As illustrated in FIG. 2, the present invention eliminates the seam 10 by stitching each pair of the partial scan lines 12, 12' together at a random stitch point 18 within a stitch zone 20 having a predetermined width. Preferably, the predetermined width of the stitch zone 20 is chosen to be on the order of twenty (20) to several hundred pixels in width, although other widths may be used depending upon the type of imaging system, scanning resolution, and other factors.

Comparing FIG. 1 to FIG. 2, it can be easily seen that the random stitch points 18 depicted in FIG. 2 are much less visible than the aligned stitch points 14 of FIG. 1 which form the visible seam 10. Essentially, the seam between the partial scan lines 12, 12' in FIG. 2 is "blurred" due to the line by line randomization of the random stitch points 18.

Figure 3:
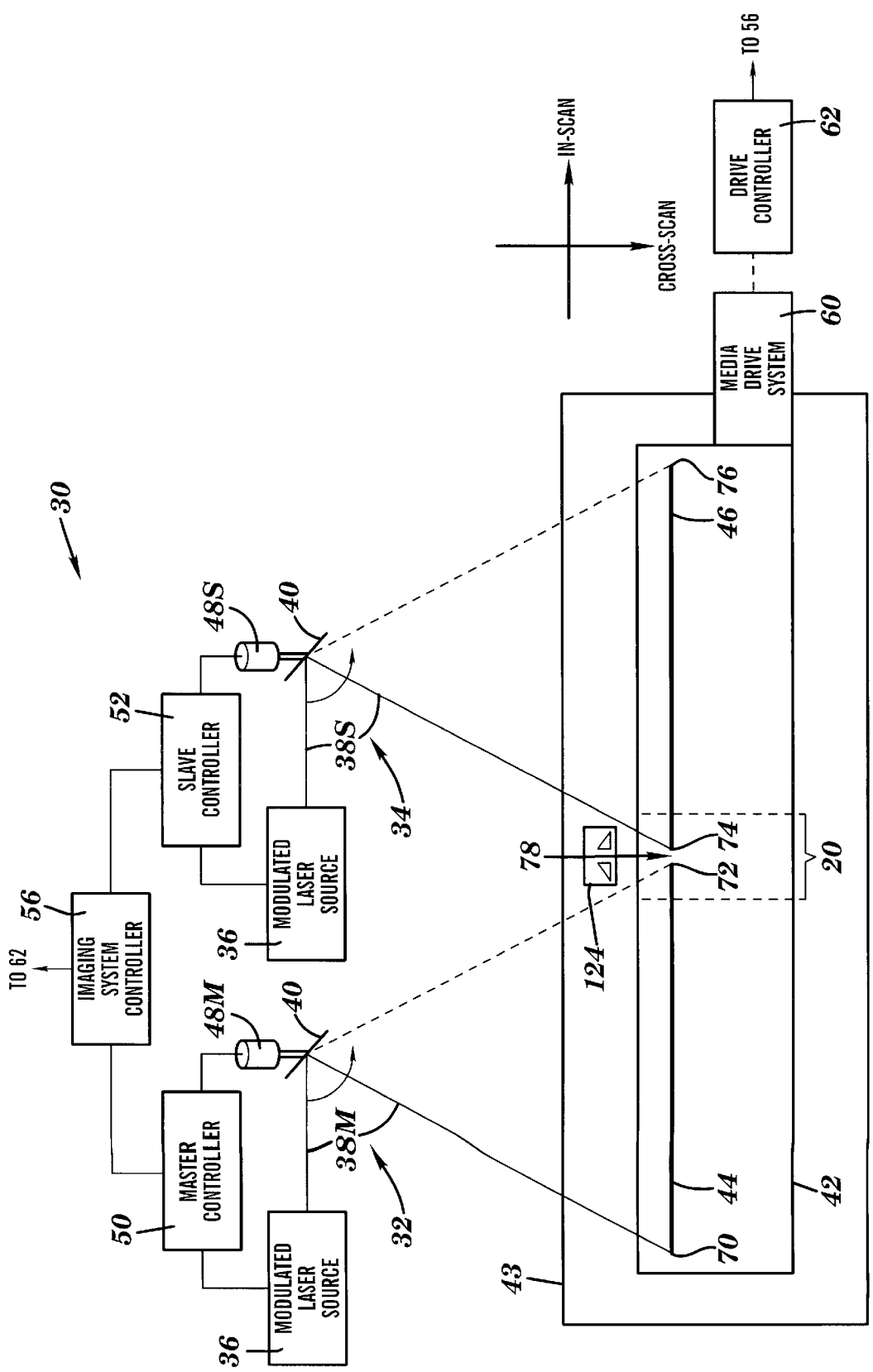
FIG. 3 illustrates an imaging system incorporating a pair of imaging sources in accordance with the present invention.

A simplified diagram of an imaging system 30 incorporating a pair of imaging sources 32, 34 in accordance with the present invention is illustrated in FIG. 3. It should be clear, however, that the present invention may be applied to an imaging system comprising any number of individual imaging sources, without departing from the intended scope of the present invention as set forth in the claims. For example, the composite scan line produced by stitching a pair of partial scan lines together may additionally be stitched to a third partial scan line or another composite scan line to form an even longer scan line. Thus, the number of partial and/or composite scan lines which may be stitched together in accordance with the present invention is virtually unlimited.

The imaging system 30 includes a first, master imaging source 32, and a second, slave imaging source 34. The master imaging source 32 includes a modulated laser source 36 for producing an imaging beam 38M, a rotating deflector 40 for writing the imaging beam 38M across the imaging media 42 supported on an imaging surface 43 in a partial scan line 44 (master scan line), a spin motor 48M for rotating the deflector 40, and a master controller 50 for controlling the operation of the master imaging source 32. Similarly, the slave imaging source 34 includes a modulated laser source 36 for producing an imaging beam 38S, a rotating deflector 40 for writing the imaging beam 38S across the imaging media 42 in a partial scan line 46 (slave scan line), a spin motor 48S for rotating the deflector 40, and a slave controller 52 for controlling the operation of the slave imaging source 34. Other types of writing sources, such as light emitting diodes (LED's), xerographic systems (e.g., toner based), ink-jet systems, or the like may also be used in accordance with the present invention to record the master and slave scan lines 44, 46 on the imaging media 42. An imaging system controller 56 is provided to coordinate the operation of the master and slave imaging sources 32, 34. The imaging media 42 may be any type of recording media commonly imaged in a flatfield system, including web-type media, film, plates, and the like. Recording media for use with xerographic, ink-jet, or similar recording systems may also be used.

In this imaging system, the master and slave imaging sources 32, 34 remain stationary while the recording media 42 is displaced during imaging. A drive system 60 of a type known in the art is used to displace the recording media 42 past the master and slave imaging sources 32, 34 to produce a series of composite scan lines 16 (see FIG. 2), each formed by the combination of a master scan line 44 and a slave scan line 46. A drive controller 62 is coupled to the imaging system controller 56 to synchronize media displacement and scan line imaging. Alternately, the imaging sources 32, 34 may be displaced during imaging while the recording media 42 remains stationary.

In FIG. 3, the master imaging source 32 is configured to image the master scan line 44 from a start point 70 to a random end point 72 within the stitch zone 20. Similarly, the slave imaging source 34 is configured to image the slave scan line 46 from a random start point 74 in the stitch zone 20 to an end point 76. Together, the master scan line 44 and slave scan line 46 form a composite scan line 16 (FIG. 2). The stitch point 78 at which the master scan line 44 ends and the slave scan line 46 begins is randomly chosen from scan line to scan line by the imaging system controller 56 in accordance with known randomizing algorithms. The present invention further provides additional optimizing algorithms (described below) which are used to relocate the original random stitch point based on factors such as the location of the stitch point in adjacent scan lines, the actual data content of the scan lines, and the type of artifacts which are to be minimized.

Several optimizing algorithms in accordance with the present invention are described with reference to FIG. 4, which illustrates a pattern of pixels 80 in and around the stitch zone 20. For convenience, the rows (i.e., scan lines) are identified by numbers and the columns are identified by letters. These algorithms include "all white", "all black", and "zone boundary" types. The examples described below are limited to the establishment of a stitch point in row #2. However, it should be clear that these randomizing algorithms are applied in a line-by-line manner to all scan lines of the image.

Figure 4:
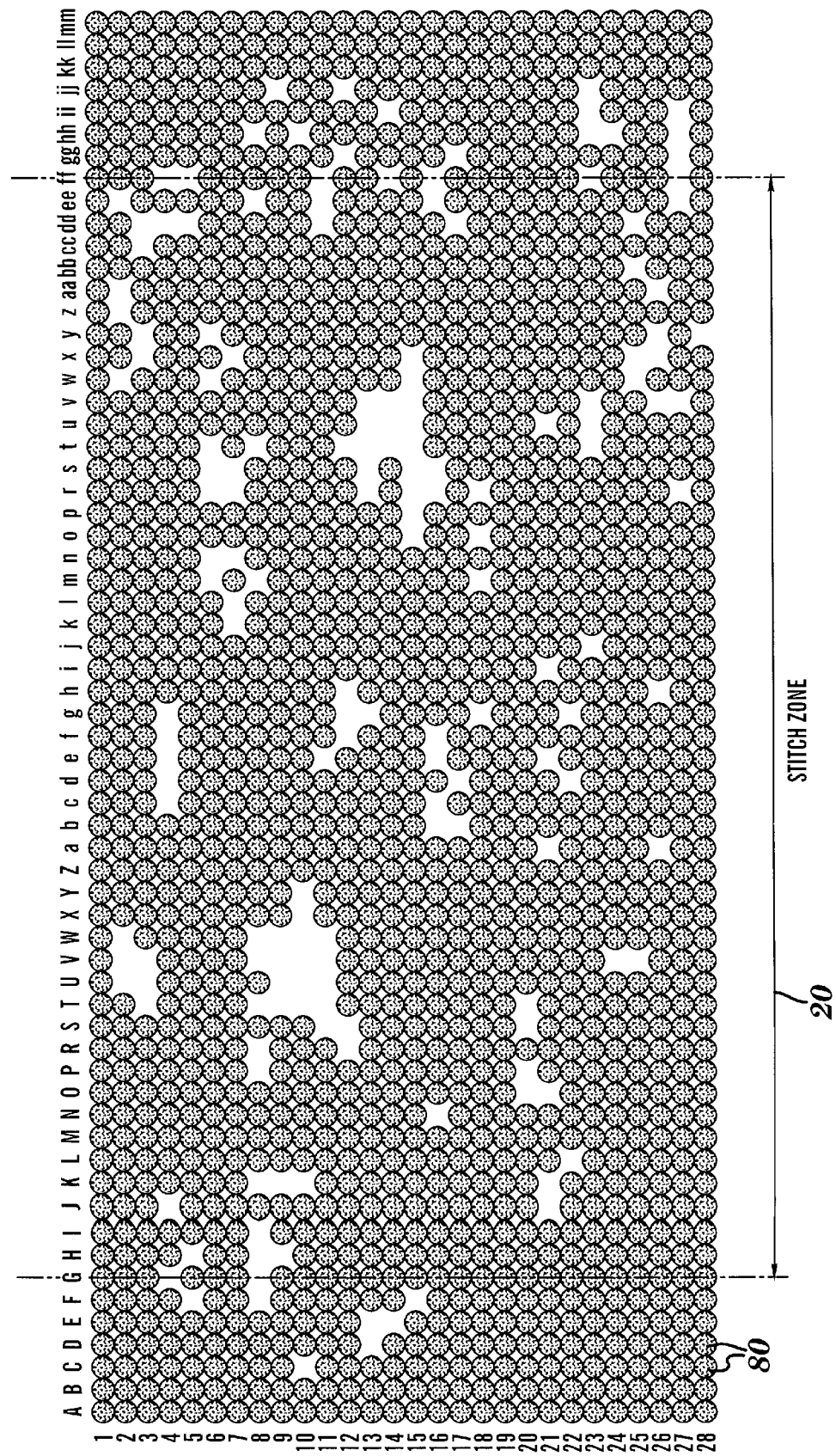
FIG. 4 is provided to illustrate the "all white", "all black" and "zone boundary" algorithms for relocating a stitch point according to the present invention.

In the following example, it is assumed that the random stitch point for row #2 is initially randomly chosen to be at the location between pixels "P" and "R." As seen in FIG. 4, this location falls between two black pixels. If the "all white" algorithm is being used, the algorithm determines if an alternate "all white" location (i.e., between two white pixels) is available in the stitch zone 20 within a predetermined number of pixels from the original random stitch point. If the predetermined number of pixels is chosen, for example, to be less than or equal to ten (10), then the location in row #2 between pixels "U" and "V" meets this criteria, and the stitch point is moved to that location. If an "all white" location is not available within the predetermined number of pixels from the original random stitch point, then the original random stitch point is retained.

Contrastingly, if an "all black" algorithm were being used in this example, the original random stitch point would be satisfactory, and would not be relocated, since it is already located between the two black pixels at "P" and "R." However, if the original random location of the stitch point did not fall between two black pixels, the "all black" algorithm would determine if an alternate "all black" location is available in the stitch zone 20 within a predetermined number of pixels from the original random stitch point. If such a location is available, then the stitch point is relocated to that position in the row. However, if an "all black" location is not available within the predetermined number of pixels from the original random stitch point, then the original random stitch point is retained.

Finally, if the "zone boundary" algorithm were being used in this example, the original random stitch point between the pixels at locations "P" and "R" would not be satisfactory, since it does not fall between the transition of a black pixel and a white pixel. The "zone boundary" algorithm subsequently determines if an alternate "zone boundary" location is available in the stitch zone within a predetermined number of pixels from the original random stitch point. If the predetermined number of pixels is again chosen to be less than or equal to ten (10), then the location in row #2 between the black and white pixels located at the "T" and "U" positions, respectively, meets this criteria, and the stitch point is relocated to that position in the row. If a "zone boundary" location is not available within the predetermined number of pixels from the original random stitch point, then the original random stitch point is retained.

Figure 5:
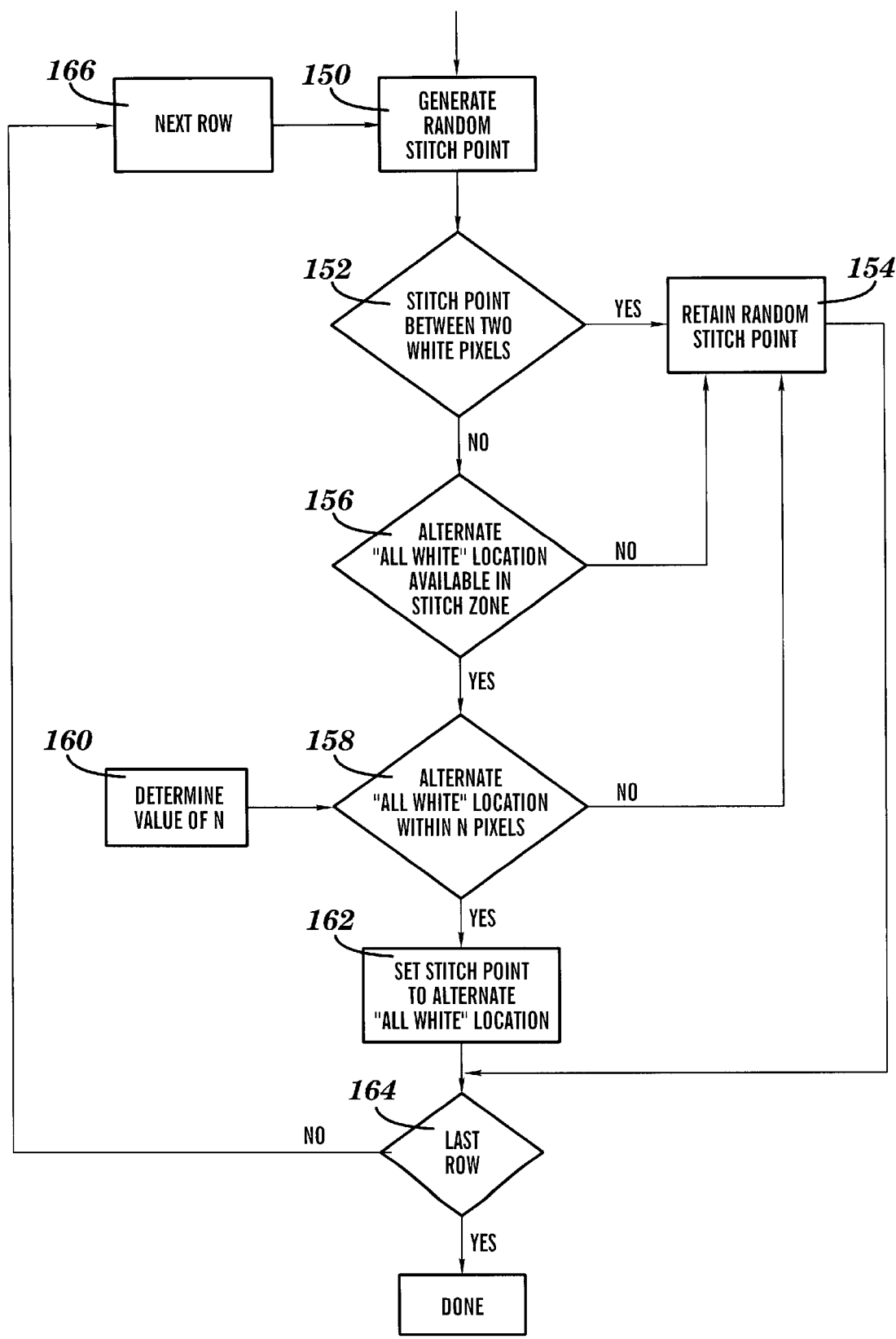
FIG. 5 is a flowchart illustrating the "all white" algorithm for relocating a stitch point.

A summary of the "all white" algorithm is illustrated in flowchart form in FIG. 5. Similar flowcharts can be used to describe the flow of the "all black" and "zone boundary" algorithms described above.

In block 150, a random stitch point is generated for the first row indicating the location in the stitch zone 20 where the master and slave scan lines 44, 46 are to be joined. If the randomly chosen stitch point falls between two white pixels 152, the stitch point is retained 154. If the randomly chosen stitch point does not fall between two white pixels 152, processing continues with block 156, which determines whether an alternate "all white" location for the stitch point is available within the stitch zone. If not, the original stitch point is retained 154. If an alternate "all white" location is available within the stitch zone, the algorithm determines 158 whether the alternate location falls within N-pixels from the original location of the stitch point. The value of N is controlled in block 160. If the alternate location is outside the N-pixel value, the original stitch point is retained 154. If acceptable 158, the alternate location is used 162 in lieu of the original stitch point. Processing subsequently continues for each remaining row 164, 166 of the image.

Two dimensional randomizing algorithms similar to the one dimensional algorithms described above may also be employed. The two dimensional algorithms take into account not only the data within the row currently under consideration, but also the data within one or more adjacent rows. Again, several algorithms may be used, including "all white", "all black", and "zone boundary." An example of the two dimensional "all white" algorithm is presented below.

Assume for example that the original random stitch point falls between pixels "P" and "R" in row #8 of FIG. 4. Although this stitch point would satisfy the one-dimensional "all white" algorithm described above, it fails to meet the criteria of an "all white" algorithm in two dimensions, since the corresponding locations between pixels "P" and "R" is rows #7 and #9 fall between black pixels. As in the one dimensional algorithm, a search is made in row #8 (within the stitch zone) for an alternate "all white" location, within a predetermined number of pixels from the original random stitch point, that best satisfies the two-dimensional "all white" requirement. For a pixel range of less than or equal to ten (10), for example, the best location for the stitch point falls between the white pixels at locations "V" and "W." As in the one dimensional case, the original stitch point is retained if a better "all white" location is not available within the predetermined pixel range.

Three dimensional algorithms follow the previously described one and two dimensional constructions except that three dimensions of data are analyzed. For example, in color printing applications, the data for each color is contained of a separate film master or printing plate. For three dimension correction the algorithm considers data in two dimensions as previously described, but with further constraints on the data in the other color layers (e.g., separations) of the image.

Although the use of random stitch points will minimize the visibility of stitch point errors, additional corrections may be required due to other factors. For example, errors along the scan line, herein referred to as in-scan errors, such as gaps or overlaps, may occur at or adjacent the stitch point due to spinner synchronization errors, thermally induced variations, mechanical misalignment, and other factors.

Figure 6:
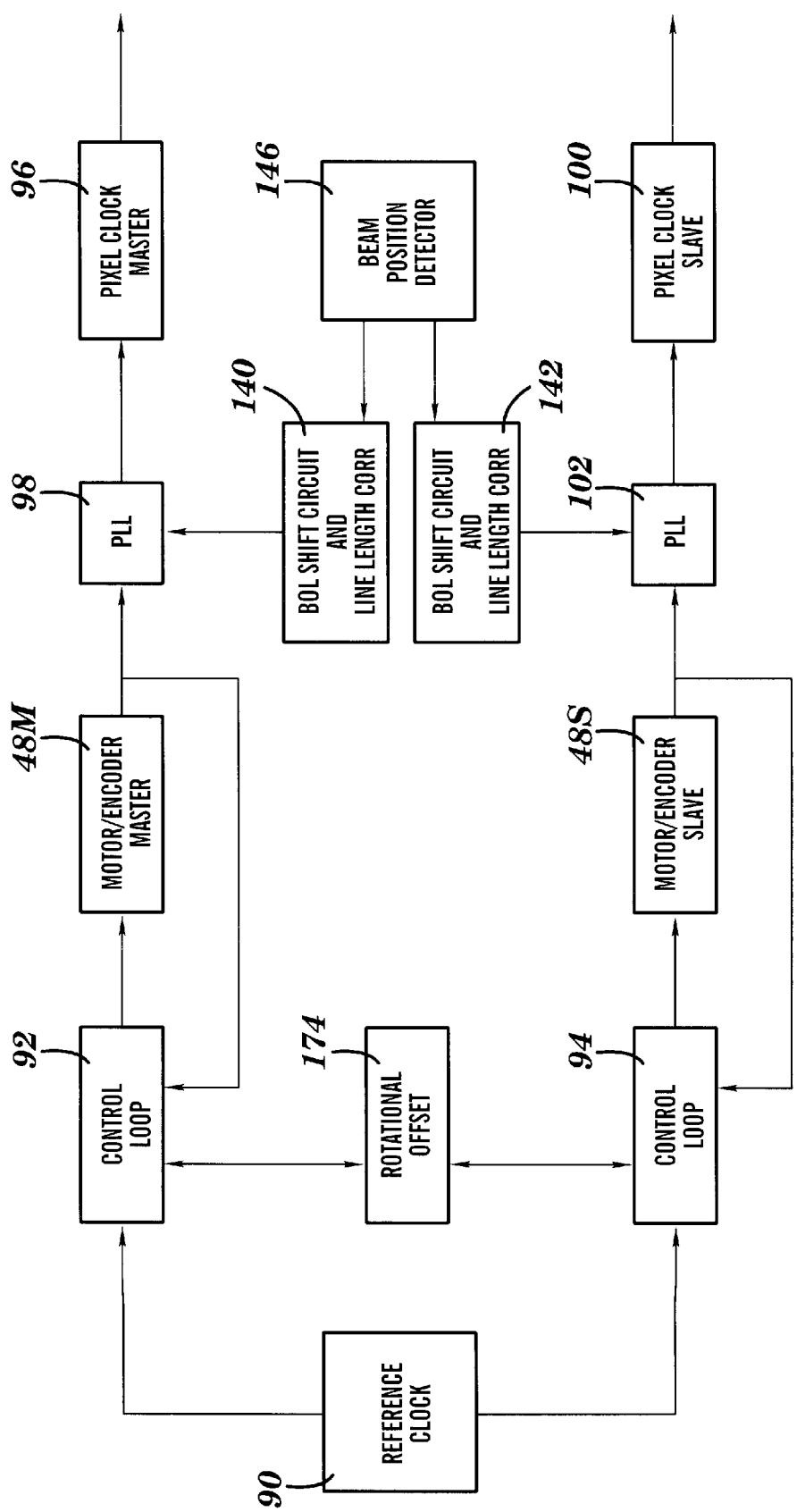
FIG. 6 is a block diagram of a system for reducing in-scan and cross-scan errors in accordance with the present invention.

To reduce spinner synchronization errors, the spin motors 48M, 48S of the master and slave imaging sources 32, 34, are synchronized to the same reference clock 90 as illustrated in FIG. 6. The rotational speed of the master spin motor 48M, provided by a corresponding encoder, is fed back to the input of the master spin motor through a control loop 92. Similarly, the rotational speed of the slave spin motor 48S, again provided by an encoder, is fed back to the input of the slave spin motor 48S through a control loop 94. The control loops 92, 94 are configured to monitor the speed of each respective spin motor, and to adjust the speed, as necessary, to ensure that the motors are each rotating at the fixed rate required for imaging.

The speed of the master spin motor 48M is additionally provided to the master pixel clock 96 through a phase locked loop (PLL) 98. In a similar manner, the speed of the slave spin motor 48S is provided to the slave pixel clock 100 through a PLL 102. The output of the master and slave pixel clocks 96, 100 are provided to the modulated laser sources 36 of the master and slave imaging sources 32, 34 to control the pixel data recording rate in the master and slave scan lines 44, 46. In this manner, time varying positional errors of the spin motors 48M, 48S, caused by load torque variations in each motor and other factors, are individually corrected by the corresponding PLL 98, 102 thereby ensuring an even spacing of recorded dots on the imaging media 42.

Imaging errors in both the in-scan and cross-scan directions may occur, for example, in response to the expansion, contraction, or misalignment of the structure mounting the master and slave imaging sources 32, 34 relative to the imaging surface 43. Further, although the imaging sources 32, 34 are preferably mounted to a common support structure (not shown), such imaging errors generally do not affect the master and slave imaging sources 32, 34 identically.

Figure 7A:
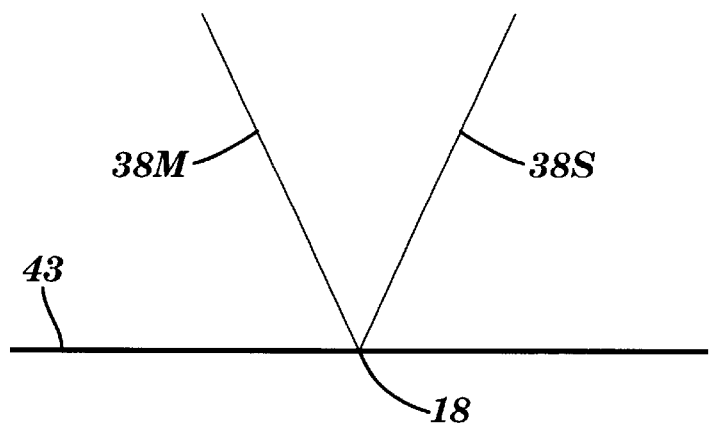
FIGS. 7A–7C illustrate examples of thermally induced in-scan errors.
Figure 7B:
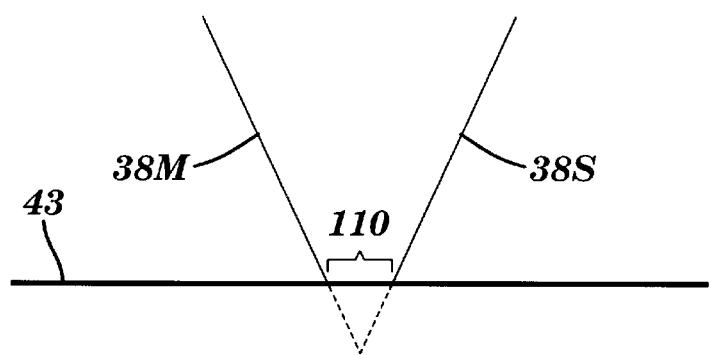
Figure 7C:
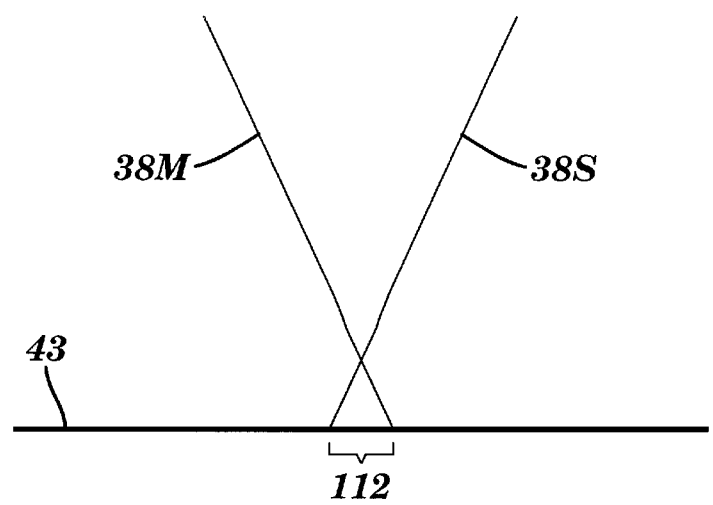

Examples of in-scan errors are illustrated with reference to FIG. 7A, 7B, and 7C. Under ideal conditions, the imaging beams 38M, 38S of the master and slave imaging sources 32, 34 meet at the random stitch point 18 as shown in FIG. 7A. As the master and slave imaging sources 32, 34 move closer to the imaging surface 43, the imaging beams 38M, 38S no longer meet at the stitch point 18, and a gap 110 is formed between the master and slave scan lines. Contrastingly, as the imaging sources 32, 34 move away from the imaging surface 43, the master and slave imaging beams 38M, 38S intersect prior to reaching the imaging surface, effectively forming an overlap 112 between the master and slave scan lines. These types of errors occur, in part, because the master and slave imaging beams 38M, 38S are not telecentric.

As detailed below, the present invention compensates for these and other types of errors using a unique photodetector-based system.

Figure 8:
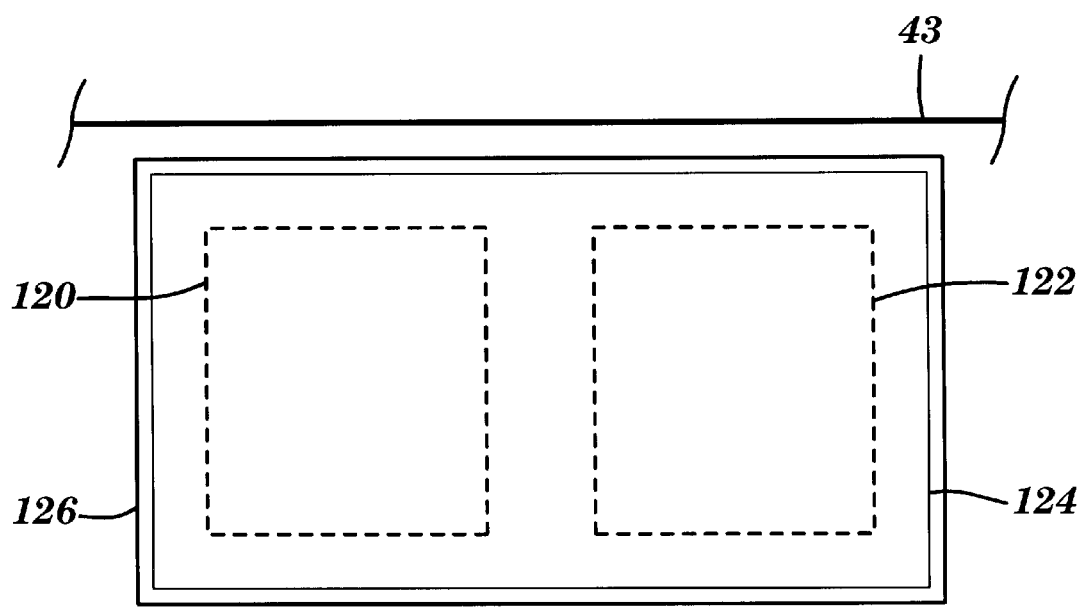
FIG. 8 illustrates a photodetector system for detecting in-scan and cross-scan errors.

The measurement and correction of imaging errors is carried out using a photodetector system including a pair of photodetectors 120, 122, and a mask 124. As shown in FIG. 8, the photodetectors 120, 122 are located in the image plane at one end of the imaging surface 43, outside the scanning area of the imaging system. Preferably, the photodetectors 120, 122 are recessed into the imaging surface, and a suitably shaped recess 126 is provided for the mask 124 such that the mask surface is virtually coplanar to the imaging surface 43. A single photodetector may also be used in lieu of the pair of photodetectors 120, 122.

Figure 9:
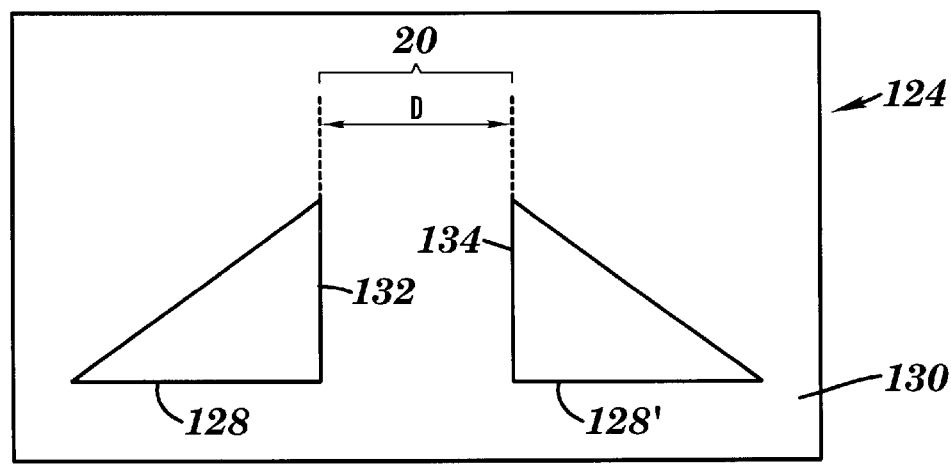
FIG. 9 illustrates a mask including a pair of back to back 30-60-90 triangular openings for use in the photodetector system of FIG. 8.

The mask 124 is illustrated in greater detail in FIG. 9. In the preferred embodiment of the present invention, the mask 124 includes a pair of back to back 30-60-90 triangular openings 128, 128', spaced apart a predetermined distance D corresponding to the width of the stitch zone 20, formed in an opaque support 130. The angles of the triangular openings 128, 128' may vary, however, based on the specific resolution of the imaging sources 32, 34 and other factors. Preferably, the mask is formed of glass which is coated with an opaque material such as chromium. The coated glass has two uncoated areas which form two transparent triangles. When the mask 124 is positioned within the recess 126, the triangular openings 128, 128' are configured to lie directly above the photodetectors 120, 122.

To compensate for in-scan errors such as gaps and overlaps, and to ensure accurate butting of the master and slave scan lines 44, 46 at the stitch point 18 of each composite scan line 16, the relative in-scan position of the master and slave imaging beams 38M, 38S can be regulated using information provided by the photodetectors 120, 122.

First, the master imaging beam 38M is scanned across the pair of triangular openings 128, 128' to determine the time it takes the beam 38M to pass from one end of the stitch zone 20, corresponding to the vertical edge 132 of the triangular opening 128, to the other end of the stitch zone 20, corresponding to the vertical edge 134 of the triangular opening 128'. As the master imaging beam 38M passes over the triangular openings 128, 128', it creates a pulse on each of the photodetectors 120, 122. The time required to pass from the vertical edge 132 of the triangular opening 128 to the vertical edge 134 of the triangular opening 128' corresponds to the time between the end of the pulse detected by the photodetector 120 and the beginning of the pulse detected by photodetector 122.

Figure 10:
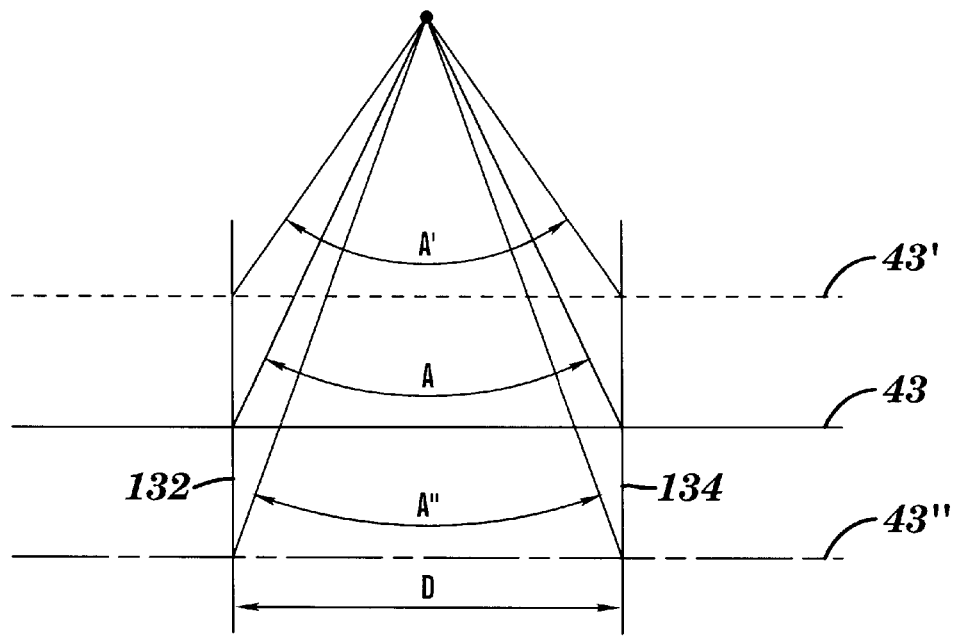
FIG. 10 illustrates a technique, using the photodetector system of FIG. 8, for determining the relative locations of the imaging surface and the imaging sources.

Under ideal conditions, as illustrated in FIG. 10, since the angular velocity of the master spin motor 48M and the distance D between the vertical edges 132, 134 of the triangular openings 128, 128' are known, the master spin motor 48M should spin through an angle A in a time T as the master imaging beam 38M traverses the distance D. If, however, the imaging surface 43' moves closer to the master imaging source 32 as shown in FIG. 10, the time T' required to traverse the distance D between the vertical edges 132, 134 of the triangular openings 128, 128', as determined by the photodetectors 120, 122, increases, since the master spin motor 48M must spin through a larger angle A' (at the same angular velocity) to traverse the same distance D. Analogously, if the imaging surface 43" moves away from the master imaging source 32, the time T" required to traverse the distance D, as measured by the photodetectors, deceases, since the master spin motor 48M must spin through a smaller angle A" to traverse the distance D.

A similar process is carried out using the slave imaging beam 38S to determine if the imaging surface 43 has moved relative to the slave imaging source 34.

By comparing the detected beam traversal times of the master and slave imaging beams 38M, 38S to an expected value, the imaging system 30 can substantially eliminate thermally induced in-scan errors such as gaps 110 and overlaps 112 between the master and scan lines 44, 46. As illustrated in FIG. 6, a master beginning of line (BOL) shift and line length correction module 140 and a slave BOL shift and line length correction module 142 are provided to compensate for thermally induced in-scan errors in the master and slave scan lines 44, 46, respectively. Each of the modules 140, 142 receives beam information from a beam position detector 146 which acquires and analyzes the output from the photodetectors 120, 122. The output from each module 140, 142 is provided to a respective one of the PLL's 98, 102 to control the operation of the master and slave pixel clocks 96, 100.

In the case where the imaging surface 43' moves closer to the master and slave imaging sources 32, 34, the length of the master and slave scan lines 44, 46 must be effectively "stretched" in time such that the correct number of pixels are imaged across a distance D in a nominal time T. This is achieved, for example, by imaging fewer pixels for each encoder count of the master and slave motors 48M, 48S, and by imaging through a greater number of encoder counts (i.e., through a larger angle A'). In addition, the BOL of the master and slave scan lines 44, 46 must be shifted in position such that imaging ends (master) or starts (slave) at the stitch point 18, thereby eliminating the gap 110.

In the analogous case where the imaging surface 43" moves further away from the master and slave imaging sources 32, 34, the length of the master and slave scan lines 44, 46 must be effectively "compressed" in time to eliminate the overlap 112. This may be achieved, for example, by imaging a greater number of pixels for each encoder count of the master and slave motors 48M, 48S, and by imaging through fewer encoder counts (i.e., a smaller angle A"). Again, the BOL of the master and slave scan lines 44, 46 must be adjusted accordingly to ensure that imaging ends (master) or starts (slave) at the stitch point 18, thereby eliminating the overlap 112.

In the case where the imaging surface 43 moves closer to the master imaging source 32 and further away from the slave imaging source 34 (or vice versa), a combination of the above techniques is applied to eliminate any gap or overlap at the stitch point 18.

The photodetectors 120, 122 and mask 124 can also be used to compensate for cross-scan error between the master and slave scan lines 44, 46. As with in-scan errors there can be several sources of cross-scan error, including, for example, velocity variations during the scan, and mechanical misalignment of the master and/or slave imaging sources 32, 34.

Figure 11:
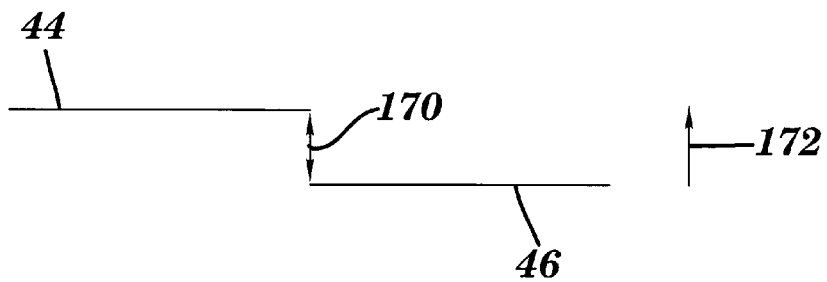
FIGS. 11 and 12 illustrate an example of a cross-scan error that may occur in the imaging system of FIG. 3, and a method according to the present invention for compensating for the cross-scan error.

An example of a cross-scan error 170 between the master and slave scan lines 44, 46 is illustrated in FIG. 11. This error can be expressed in terms of line widths of the imaging addressability of the imaging sources 32, 34. In this example, a cross-scan error of 2.45 line widths exists between the master scan line 44 and the slave scan line 46.

To compensate for this cross-scan error, given a media transport motion in the direction of arrow 172, the imaging of the master scan line 44 must be delayed by 2.45 line widths. In accordance with the present invention, this can be accomplished in two steps.

Figure 12:
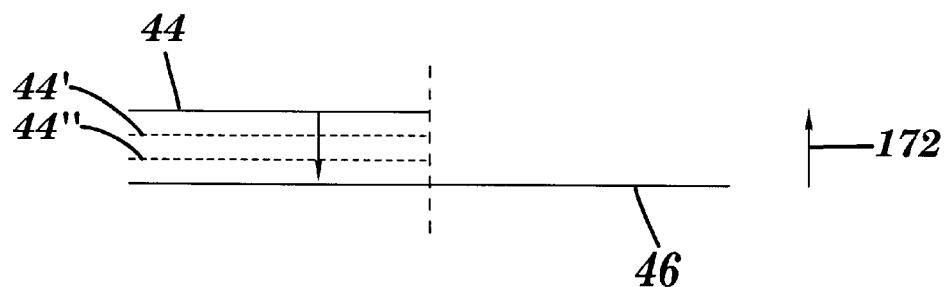

First, to compensate for the integer portion of the cross scan error (2, in the current example), the imaging data for the master scan line 44 and the two following master scan lines 44', 44" (FIG. 12) is buffered prior to being imaged by the master imaging source 32. This prevents the master scan lines 44, 44', 44" from being imaged prior to the imaging of the lagging slave scan line 46. To compensate for the fractional portion of the cross scan error (0.45, in the current example), a rotational offset 174 (FIG. 6) of 0.45 line widths is applied to master motor 48M, such that the start of imaging of the master scan line 44 is further delayed by 0.45 line widths relative to the start of imaging of the slave scan line 46. The master scan line 44 is subsequently accessed from the buffer and recorded on the imaging media, and the process is repeated as necessary. Of course, it should be clear that the converse of the above-described method may be used in the case where the master scan line 44 lags the slave scan line 46.

Figure 13:
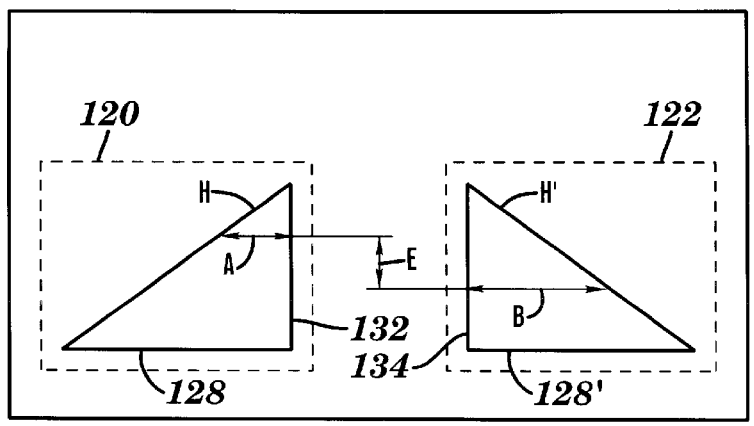
FIG. 13 illustrates a technique for determining cross-scan error according to the present invention.

The degree of cross-scan error is measured by determining the difference in time required for the master and slave imaging beams 38M, 38S to pass across the triangular openings 128, 128', respectively, of the photodetector system. Specifically, as illustrated in FIG. 13, the master imaging beam 38M is passed over the triangular opening 128 as indicated by A, and the time required to pass from the hypotenuse H of the opening 128 to the vertical edge 132 thereof is detected by the underlying photodetector 120. Similarly, the slave imaging beam 38S is passed over the triangular opening 128' as indicated by B, and the time required to pass from the vertical edge 134 to the hypotenuse H' of the opening 128' is detected by the photodetector 122. Since the size of the triangular opening 128 is known, and the angular velocity of the master spin motor 48M is known and constant, the point of intersection of the master imaging beam 38M on the vertical edge 132 of the triangular opening 128 can be easily determined. The same applies to the intersection point of the slave imaging beam 38S on the vertical edge 134 of the triangular opening 128'. These values can then be compared to quantify the cross-scan error E.

In an alternated embodiment, a mask including a single triangular opening is used to measure the cross-scan error. In this embodiment, a single photodetector may be used. The cross-scan error is measured by sequentially imaging the master and slave imaging beams 38M, 38S over the triangular opening in the mask, and by comparing the time required for the imaging beams 38M, 38S to travel between the hypotenuse and vertical edge of the triangular opening.

In other embodiments of the present invention, the in-scan and cross-scan error may be measured using a mask having other types of openings therethrough. For example, the mask may include a triangular opening and a vertical slit, one or more angled and vertical slits, a combination of triangular openings and vertical/angled slits, or other suitably shaped openings. The in-scan error may be determined, for example, by measuring the time required for an imaging beam to pass from the vertical edge of a triangular opening to a vertical slit, or vice versa, or from one vertical slit to another vertical slit. Analogously, the cross-scan error may be determined by comparing the time required for the master and slave imaging beams to travel between an angled and a vertical slit or vice versa.

Figure 14:
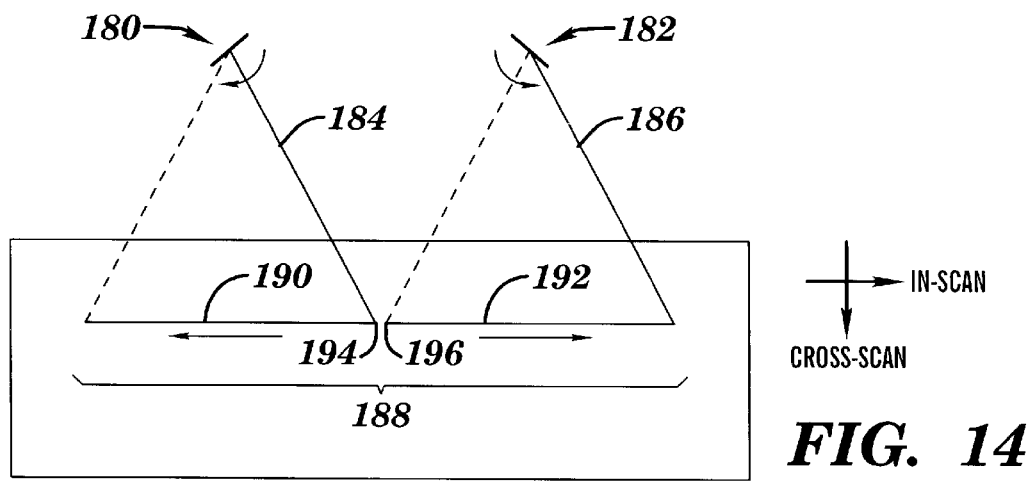
FIG. 14 illustrates an imaging system incorporating a pair of oppositely directed imaging sources in accordance with an alternate embodiment of the present invention.

A further feature of the present invention is illustrated in FIG. 14, wherein a pair of imaging sources 180, 182, which are configured to scan imaging beams 184, 186 in opposite directions, are used to image a composite scan line 188 formed of partial scan lines 190, 192. This configuration eliminates several error sources present in the imaging system previously described with regard to FIG. 3.

When using the oppositely scanning imaging sources 180, 182, the BOL 194, 196 of the partial scan lines 190, 192 are located in the center of the image, or elsewhere within the stitch zone 20 if a random stitch point is used. Advantageously, since the partial scan lines 190, 192 begin at substantially the same location, the gap/overlap errors which may occur due to uncompensated velocity variations or thermal variations during the scan are eliminated. Small line length errors may still occur, but these errors will not produce highly noticeable artifacts in the final image.

The use of the oppositely directed imaging sources 180, 182 also reduces cross-scan error as synchronization is established at the start of scan and any velocity variations which affect the cross-scan position of the beams due to the motion of the imaging surface in the cross-scan direction accumulate along the scan line and become an error in the line to line cross-scan spacing. This error is no more than already exists when using a single imaging system.

Figure 15:
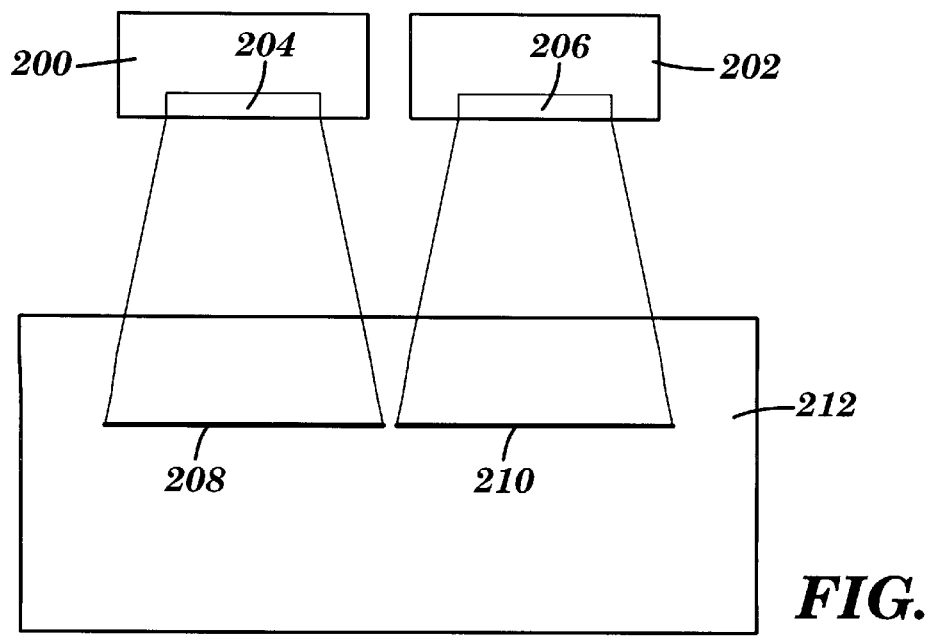
FIG. 15 illustrates a scanning system incorporating a pair of image capture systems in accordance with the present invention.

Although described above with regard to an imaging system incorporating a plurality of imaging sources, it should be noted that many aspects of the present invention may be used in a scanning system wherein a plurality of image capture systems, each including a linear array of photosensitive elements or the like (e.g., a linear charge coupled device (CCD) array), are used to capture and convert an image into partial scan lines of digital data. Such a scanning system is illustrated in FIG. 15, wherein a pair of image capture systems 200, 202, each including a respective linear CCD array 204, 206, are used to capture partial scan lines 208, 210 of an image 212. The digital data for the partial scan lines may be stitched together at random locations within a stitch zone as previously described herein to form composite scan lines. The random stitching of the present invention may also be used to form composite scan lines based on the partial scan lines produced by the image capture system of an X-Y scanning system.

The foregoing description of the present invention has been presented for purposes of illustration and description. It is not intended to be exhaustive or to limit the invention to the precise form disclosed, and many modifications and variations are possible in light of the above teaching. Such modifications and variations that may be apparent to a person skilled in the art are intended to be included within the scope of this invention as defined by the accompanying claims.

What is claimed is:

1. A method for stitching a plurality of pairs of partial scan lines together to form a series of composite scan lines, comprising the steps of:

establishing a stitch zone in which each pair of partial scan lines is to be stitched together;

stitching each pair of partial scan lines together at a random stitch point within the stitch zone to form one of the series of composite scan lines;

determining if the random stitch point of a composite scan line falls between a pair of pixels having a predetermined data content; and relocating the random stitch point of a composite scan line if the random stitch point does not fall between a pair of pixels having a predetermined data content.

2. The stitching method according to claim 1, further including the step of:

preventing adjacent ones of the composite scan lines from having substantially similar stitch points within the stitch zone.

3. The stitching method according to claim 1, further including the step of:

minimizing a gap between the pair of partial scan lines at the stitch point of each composite scan line.

4. The stitching method according to claim 1, further including the step of:

minimizing an overlap of the pair of partial scan lines at the stitch point of each composite scan line.

5. The stitching method according to claim 1, wherein the pair of pixels are white.

6. The stitching method according to claim 1, wherein the pair of pixels are black.

7. The stitching method according to claim 1, wherein one of the pair of pixels is white and the other of the pair of pixels is black.

8. The stitching method according to claim 1, further including the step of:

retaining the random stitch point of a composite scan line if the random stitch point falls between a pair of pixels having the predetermined data content.

9. The stitching method according to claim 1, wherein the step of relocating the random stitch point of a composite scan line further includes the steps of:

determining if an alternate location, where a pair of pixels have the predetermined data content, is available in the stitch zone within a predetermined number of pixels from the random stitch point;

if the alternate location is available, relocating the random stitch point to the alternate location; and if the alternate location is not available, retaining the random stitch point.

10. A method for forming composite scan lines from partial scan lines, comprising the steps of:

establishing a stitch zone in which partial scan lines are to be stitched together to form a composite scan line;

forming the composite scan line by stitching together a pair of the partial scan lines at a random stitch point within the stitch zone;

determining if the position of the random stitch point of the composite scan line falls within an area of pixels having a predetermined data content; and relocating the random stitch point of the composite scan line if the position of the random stitch point does not fall within an area of pixels having the predetermined data content.

11. The method according to claim 10, wherein the relocating step further includes the steps of:

determining if an alternate location, located within an area of pixels having the predetermined data content, is available in the stitch zone within a predetermined number of pixels from the random stitch point; and if the alternate location is available, relocating the random stitch point to the alternate location.

12. The method according to claim 10, wherein the area of pixels is limited to pixels of the composite scan line.

13. The method according to claim 10, wherein the area of pixels includes pixels of the composite scan line and pixels of at least one adjacent composite scan line.

14. The method according to claim 10, wherein the composite scan line forms a portion of a first color separation, and wherein the area of pixels includes pixels of the composite scan line, pixels of at least one adjacent composite scan line, and pixels of at least one additional color separation.

15. An imaging system comprising:

a system for recording an image formed by a series of composite scan lines onto a supply of recording media;

a system for stitching a plurality of partial scan lines together at random stitch points within a stitch zone to form each of the series of composite scan lines; and a system for determining if the random stitch point of a composite scan line falls between a pair of pixels having a predetermined data content;

wherein the stitching system further includes a system for relocating the random stitch point of a composite scan line if the random stitch point for the composite scan line does not fall between a pair of pixels having the predetermined data content.

16. The imaging system of claim 15, further comprising:

at least one imaging source for producing the plurality of partial scan lines.

17. The imaging system of claim 15, wherein the stitching system further includes:

a system for retaining the random stitch point of a composite scan line if the random stitch point for the composite scan line falls between a pair of pixels having the predetermined data content.

18. The imaging system of claim 15, wherein the relocating system further includes:

a system for determining if an alternate location, where a pair of pixels have the predetermined data content, is available in the stitch zone within a predetermined number of pixels from the random stitch point, wherein, if the alternate location is available, the relocating system relocates the random stitch point to the alternate location.

19. A scanning system comprising:

a system for scanning an image to provide a plurality of partial scan lines of pixel data;

a system for stitching a plurality of the partial scan lines together at random stitch points within a stitch zone to form a series of composite scan lines, the stitching system including a system for determining if the random stitch point of a composite scan line falls between a pair of pixels having a predetermined data content, a system for retaining the random stitch point of a composite scan line if the random stitch point for the composite scan line falls between a pair of pixels having the predetermined data content, and a system for relocating the random stitch point of a composite scan line if the random stitch point for the composite scan line does not fall between a pair of pixels having the predetermined data content.

20. The imaging system of claim 19, wherein the relocating system further includes:

a system for determining if an alternate location, where a pair of pixels have the predetermined data content, is available in the stitch zone within a predetermined number of pixels from the random stitch point, wherein, if the alternate location is available, the relocating system relocates the random stitch point to the alternate location.

21. An apparatus for stitching a plurality of pairs of partial scan lines together to form a series of composite scan lines, comprising:

means for establishing a stitch zone in which each pair of partial scan lines is to be stitched together;

means for stitching each pair of partial scan lines together at a random stitch point within the stitch zone to form one of the series of composite scan lines;

means for determining if the random stitch point of a composite scan line falls between a pair of pixels having a predetermined data content; and means for relocating the random stitch point of a composite scan line if the random stitch point for the composite scan line does not fall between a pair of pixels having the predetermined data content.

22. A method for stitching a plurality of pairs of partial scan lines together to form a series of composite scan lines, comprising:

establishing a stitch zone in which each pair of partial scan lines is to be stitched together;

stitching each pair of partial scan lines together at a random stitch point within the stitch zone to form one of the series of composite scan lines;

determining if an area around the random stitch point of a composite scan line contains pixels having a predetermined data content; and relocating the random stitch point of a composite scan line if the area around the random stitch point does not contain pixels having the predetermined data content.

23. The stitching method according to claim 22, wherein the area includes a portion of the composite scan line and a portion of at least one adjacent composite scan line.

24. The stitching method according to claim 22, further including:

retaining the random stitch point of a composite scan line if the area around the random stitch point contains pixels having the predetermined data content.

25. The method according to claim 22, wherein relocating the random stitch point of a composite scan line further includes:

determining if an alternate location, located within an area of pixels having the predetermined data content, is available in the stitch zone within a predetermined number of pixels from the random stitch point;

if the alternate location is available, relocating the random stitch point to the alternate location; and if the alternate location is not available, retaining the random stitch point.

* * * * *